United States Patent

Burrell

[15] 3,648,537
[45] Mar. 14, 1972

[54] TRANSMISSION CONTROL
[72] Inventor: Frank C. Burrell, Orchard Lake, Mich.
[73] Assignee: General Motors Corporation, Detroit, Mich.
[22] Filed: Nov. 12, 1970
[21] Appl. No.: 88,908

[52] U.S. Cl. ..............................................................74/477
[51] Int. Cl. ..........................................................G05g 5/10
[58] Field of Search................74/477, 475, 476, 473 R

[56] References Cited

UNITED STATES PATENTS

| | | | |
|---|---|---|---|
| 3,264,894 | 8/1966 | Popovich et al. | 74/477 |
| 3,444,752 | 5/1969 | Fisher et al. | 74/477 |
| 3,486,392 | 12/1969 | Ivanchich | 74/477 |
| 3,526,151 | 9/1970 | Miller | 74/477 |

*Primary Examiner*—Milton Kaufman
*Attorney*—W. E. Finken, A. M. Heiter and R. L. Phillips

[57] ABSTRACT

There is disclosed a transmission control linkage for a multispeed transmission having gearing and shiftable elements that are operable on selective shifting to establish different transmission drives through the gearing. The shiftable elements are controlled by shift fork levers with a detent mechanism operating to prevent movement of one of the shift fork levers when the other lever is not in its neutral position. A sequence mechanism cooperates with the detent mechanism to lock one of the shift fork levers against movement from one of its shift positions to a previously selected shift position until after the other shift fork lever has been moved from neutral to one of its shift positions to assure certain sequential shifting.

4 Claims, 10 Drawing Figures

Patented March 14, 1972 3,648,537

INVENTOR.
Frank C. Burrell
BY
Ronald L. Phillips
ATTORNEY

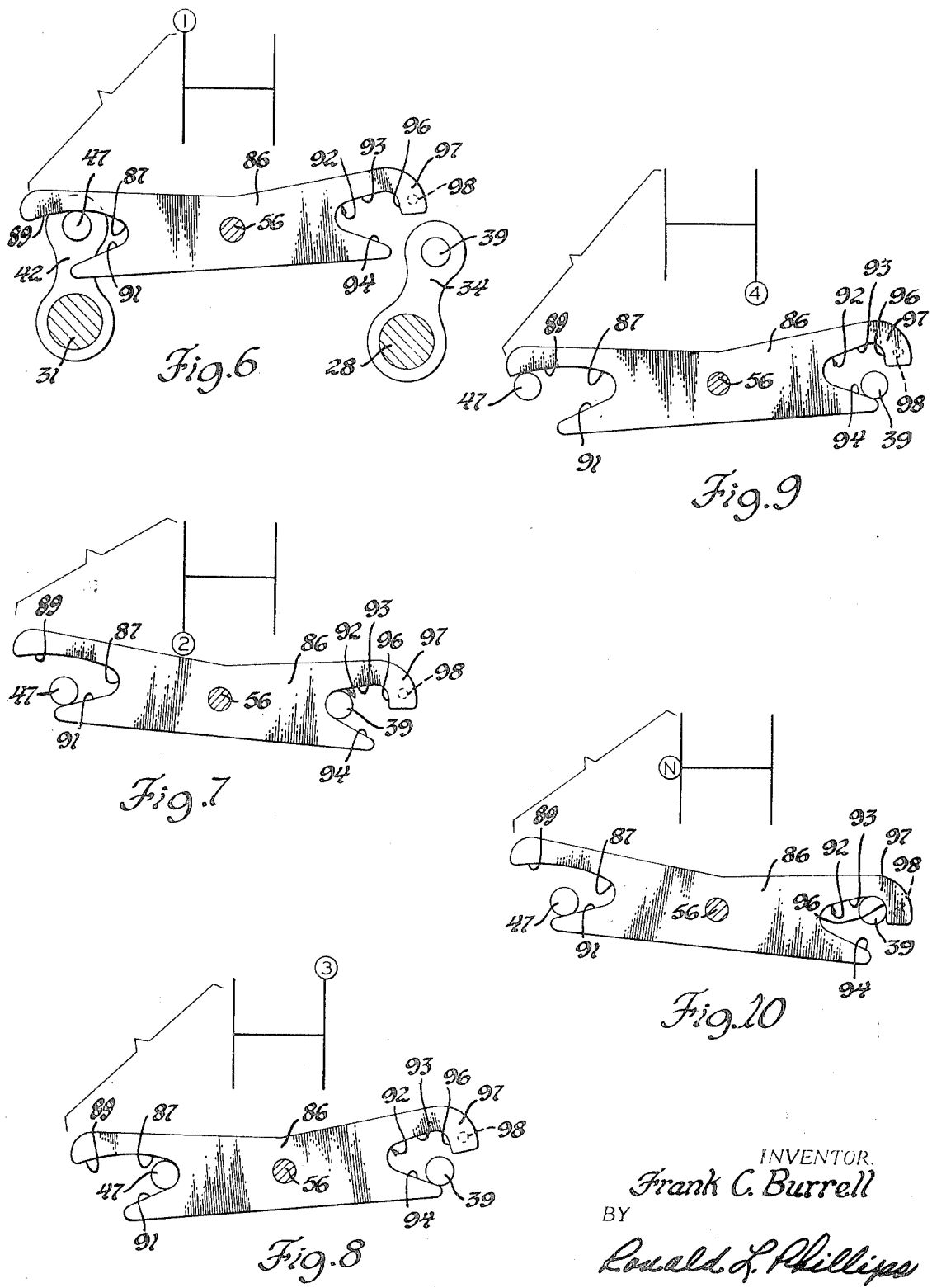

TRANSMISSION CONTROL

This invention relates to transmission controls and more particularly to transmission controls providing for sequential shifting.

In manually shiftable transmissions in general, the operator is normally free to select any one of the transmission's gear ratios by operation of the transmission's control linkage, it being left to the operator to make the proper gear ratio selection. In shift control linkages where the operator moves the manual shift lever in the same general direction to select one of several gear ratios, he may unintentionally select a gear ratio that is not suited to the vehicle speed at the time of shift which in the case of a downshift may cause an undesirably high engine speed.

An object of the present invention is to provide a transmission control linkage that assures a certain shift sequence in a multispeed transmission to prevent downshifting that would result in undesirably high engine speed.

Another object is to provide in a transmission control linkage for a multispeed transmission a shift sequence mechanism that operates to permit sequential upshifting and assures certain sequential downshifting.

Another object is to provide in a transmission control linkage for a multispeed transmission a sequence mechanism that operates to permit sequential upshifting from the lowest speed range drive to the highest speed range drive and prevents downshifting from an intermediate speed range drive to the lowest speed range drive until a higher speed range drive has been established.

These and other objects of the invention will be more apparent from the following description and drawing in which:

FIGS. 6 through 10 show the various positions of the sequence mechanism.

Figure 1:
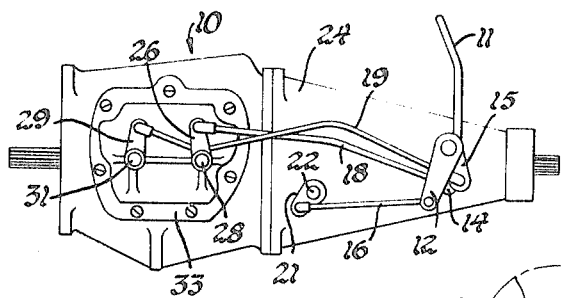
FIG. 1 is an elevation view of a transmission having control linkage employing a sequence mechanism constructed according to the present invention.

The invention is illustrated in use in a transmission 10 which provides four forward speed drives and a reverse drive and may have gearing like that shown in U.S. Pat. No. 3,088,336 to Fodrea. Referring to FIG. 1, a transmission shift lever 11 which the operator manually controls is connected by a mechanism such as shown in U.S. Pat. No. 2,922,315 to Primeau to selectively operate a reverse lever 12, a 1-2 lever 14, and 3-4 lever 15. Levers 12, 14 and 15 are connected by rods 16, 18 and 19, respectively, to a reverse shift lever 21 which is pivotally mounted on a reverse shaft 22 supported in the transmission's housing 24, a 1-2 shift lever 26 which is mounted on a 1-2 shift shaft 28 and a 3-4 shift lever 29 which is mounted on a 3-4 shift shaft 31.

Figure 2:
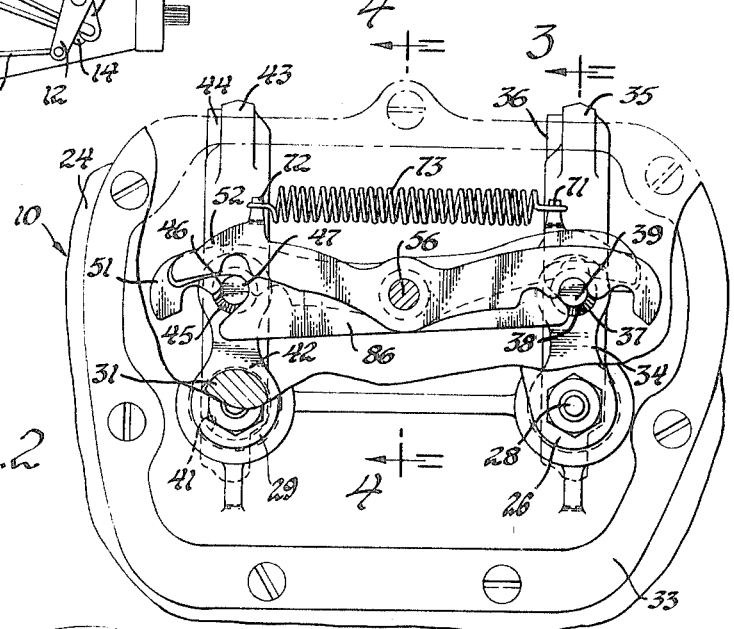
FIG. 2 is a partial enlargement of FIG. 1 with certain parts broken away to show the transmission's internal control linkage.
Figure 3:
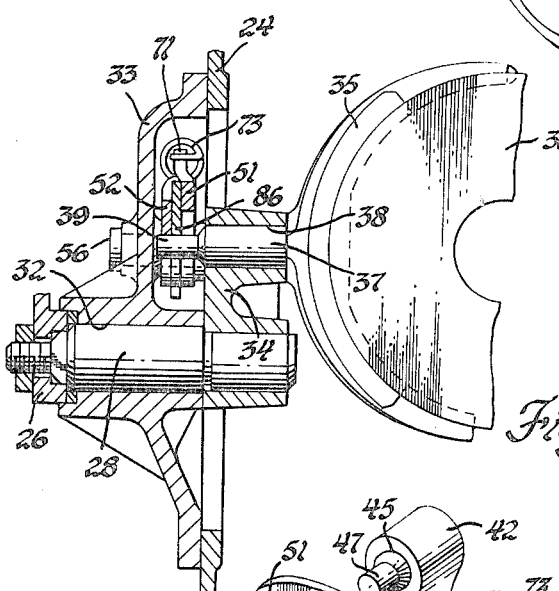
FIG. 3 is a view taken on the line 3—3 in FIG. 2.

The 1-2 shift shaft 28 is rotatably mounted in a bearing aperture 32 of a cover plate 33 which is connected by screws to one side of the transmission housing 24 to cover the internally mounted portion of the shift control linkage. A 1-2 shift fork lever 34 which is fixed to the inner end of shaft 28 operates a 1-2 shift fork 35. As shown in FIGS. 2 and 3, the shift fork 35 which engages a shift collar 36 of the transmission's gearing in a conventional manner as disclosed in the Fodrea U.S. Pat. No. 3,088,336 has a trunnion 37 rotatably mounted in a bearing aperture 38 that is located in lever 34. The bearing aperture 38 and thus trunnion 37 is spaced from the pivot axis of lever 34 which axis is the pivot axis of shaft 28. The trunnion 37 has a coaxially extending portion providing a 1-2 locking pin 39.

The 3-4 shift shaft 31 is similarly rotatably mounted in a bearing aperture 41 in the transmission cover plate 33 and has fixed thereto at its inner end a 3-4 shift fork lever 42. A 3-4 shift fork 43 that engages a shift collar 44 in the gearing as disclosed in the Fodrea U.S. Pat. No. 3,088,336 has a trunnion 45 extending therefrom rotatably mounted in a bearing aperture 46 spaced from the axis of shaft 31. The trunnion 45 has a coaxial extension providing a 3-4 locking pin 47.

A pair of identical interlock or detent levers 51 and 52 have central apertures 53 and 54 to pivotally mount the levers on a pivot pin 56. Pin 56 is fitted in an aperture 57 in the transmission cover plate 33 and has an integral head 58 at one end and a washer 59 at the other end to retain the interlock levers in position. The interlock lever 51 has at one end a plurality of shallow recesses along the lower edge comprising a neutral recess 61 intermediate a fourth speed recess 62 and a third speed recess 63 with all of these recesses positioned to engage the 3-4 locking pin 47. At the other end of lever 51 on the lower edge there is a deep locking recess 64 and cam surfaces 65 on opposite sides of recess 64. The locking recess 64 and cam surfaces 65 are positioned to cooperate with the 1-2 locking pin 39. The other interlock lever 52 has three shallow recesses comprising a neutral recess 66 intermediate a second speed recess 67 and a first speed recess 68 with all of these recesses positioned to engage the 1-2 locking pin 39. At the other end of lever 52 on the lower edge there is a deep locking recess 69 and adjacent cam surfaces 70 for engaging the 3-4 locking pin 47. The lever 51 has a spring anchor tab 71 and the lever 52 has a spring anchor tab 72 between which a spring 73 is connected to bias lever 51 to pivot in a counterclockwise direction and lever 52 to pivot in a clockwise direction about pin 56.

The detent mechanism comprising interlock levers 51 and 52 operates to prevent movement of either of the shift fork levers 34 and 42 from the neutral position shown in FIG. 2 to any shift position unless the other shift fork lever is in the neutral position and also prevents simultaneous movement of both shift fork levers from the neutral position. The spring 73 biases the levers so the end of each interlock lever with the three recesses engages its associated locking pin and the other end of each interlock lever with the single deep recess is withdrawn from its associated locking pin. On initial movement of the 1-2 shift fork lever 34 from neutral toward the first gear ratio or speed position, the pin 39 must pass under the lobe between recesses 66 and 68, pivoting lever 52 counterclockwise as viewed in FIGS. 2 and 5. This movement is permitted only if the 3-4 shift fork lever 42 and pin 47 are in the neutral position so interlock lever 52 may rotate with locking pin 47 entering recess 69. If lever 42 is not in neutral, one of the cam surfaces 70 engages locking pin 47 and prevents any counterclockwise movement of lever 52 and thus movement of the 1-2 shift fork lever 34. When the 1-2 shift fork lever 34 is moved to either the first speed position with the locking pin 39 under recess 68 or to the second position with the locking pin 39 under recess 67, the locking pin 39 will be located under one of the cam surfaces 65 of lever 51 preventing clockwise movement of lever 51 so that the neutral recess 61 positively engages the locking pin 47 to hold or lock the 3-4 shift fork lever 42 in neutral position. Similarly, when the 3-4 shift fork lever 42 is moved so that the locking pin 47 is in either the third speed recess 63 or the fourth speed recess 62, the locking pin 47 will be beneath one of the cam surfaces 70 on lever 52 to pivot lever 52 clockwise so that the neutral recess 66 engages locking pin 39 to prevent movement of the 1-2 shift fork lever 34.

The shift collars 36 and 44 controlled by the respective shift fork levers 34 and 42 operate in the gearing as disclosed in the Fodrea U.S. Pat. No. 3,088,336 to establish the four different forward transmission drives. The establishment of these four forward drives by the controlled movement of shift fork levers 34 and 42 is shown sequentially in FIGS. 6 through 9 starting with the lowest speed range drive and with FIG. 10 showing the neutral condition, the selection of these drives being effected by the operator moving the manual shift lever 11 along an H-shaped path. In FIGS. 6–10, this H-shaped shift pattern is repeated with the encircled numerals 1, 2, 3 and 4 and the letter N illustrating the location of the manual shift lever in the respective drives and neutral.

Figure 4:
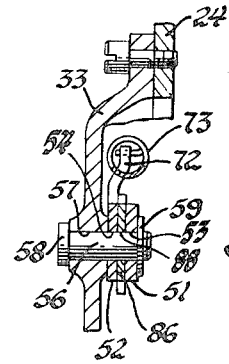
FIG. 4 is a view taken on the line 4—4 in FIG. 2.
Figure 5:
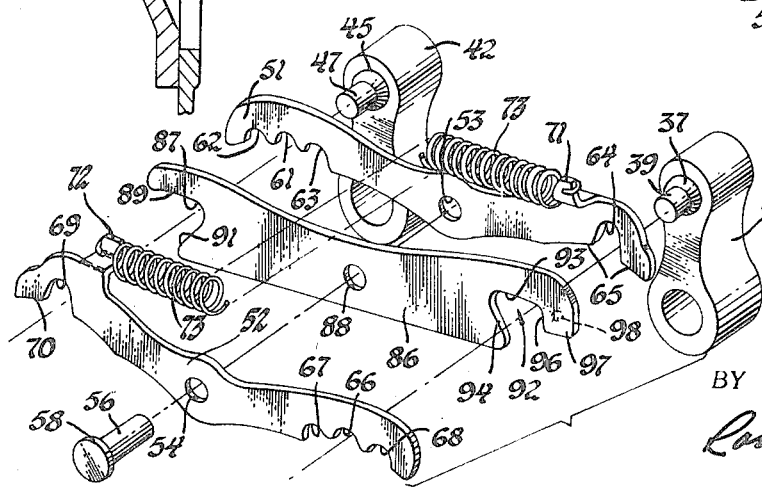
FIG. 5 is a partial exploded view of the internal control linkage.

A sequence mechanism for permitting sequential upshifting through all of the forward drives and preventing a downshift from the second to the first speed drive until after either third or fourth speed drive has been selected comprises a sequence lever 86 which, as best shown in FIGS. 4 and 5, has a central aperture 88 to pivotally mount this lever on the pivot pin 56 intermediate the two interlock levers 51 and 52. The sequence lever 86 has at one end a notch 87 which is positioned to receive the locking pin 47. Notch 87 has a stop surface 89 which follows the path of travel of pin 47 and a cam surface 91 which is oblique to the path of travel of pin 47. At the other end of sequence lever 86 there is a notch 92 which is positioned to receive the other locking pin 39. Notch 92 has a stop surface 93 which follows the path of travel of pin 39 and a cam surface 94 which is oblique to the path of travel of pin 39. In addition to the stop and cam surfaces, the notch 92 has a latching surface 96 on a latching arm 97 of sequence lever 86. Latching surface 96 is perpendicular to the path of travel of pin 39 when this pin is in the neutral position. The latching arm 97 has a projection or bump 98 on the side facing interlock lever 51 that is positioned to engage the outer cam surface 65 on this lever.

The sequence lever 86 operates to permit sequential shifting from first to second to third to fourth forward drive and during such operation assures an intended shift from the second to the third forward drive by preventing the operator from inadvertently downshifting from the second to the first forward drive. When the operator operates the shift control linkage to pivot the 1-2 shift fork lever 34 clockwise from neutral to engage the first speed drive, the sequence lever 86 is prevented from counterclockwise movement only by stop surface 89 which permits the lever to be positioned in an unlock position as shown in FIG. 6. In the unlock position the locking pin 39 rotates with lever 34 clear of the latching arm 97 to establish the first speed drive. Then when the operator operates the shift linkage to select the second speed drive by pivoting the 1-2 shift fork lever 34 from the first speed position through neutral to the second speed drive position, the locking pin 39 contacts the cam surface 94 and pivots the sequence lever 86 clockwise about pin 56 to a lock position which is determined by the cam surface 91 at the other lever end coming into contact with locking pin 47 as shown in FIG. 7. Then, as shown in FIG. 8, when the operator operates the shift control linkage to upshift from a second to the third speed drive by properly moving the shift control lever 11 to pivot the 3-4 shift fork lever 42 clockwise, the locking pin 47 engages the cam surface 91 to pivot the sequence lever 86 counterclockwise back to its unlock position bringing the cam surface 94 into contact with the other locking pin 39 which is then in its neutral position. On an intended upshift from second to third speed drive and in the event the operator inadvertently manipulates the shift control lever 11 such that the 1-2 shift fork lever 34 is urged to pivot clockwise toward the first speed position, the locking pin 39 moves along stop surface 93 without causing counterclockwise movement of sequence lever 86 so that the sequence lever 86 remains in the lock position shown in FIG. 7. In the lock position, the latching surface 96 is positioned to intercept the locking pin 39 as shown in FIG. 10 to prevent movement of the 1-2 shift fork lever 34 from neutral to the first speed position. Thus, the first speed drive is effectively locked out upon the selection of the second speed drive and the operator must effect an upshift into third speed drive rather than being permitted to downshift to first speed drive. On upshifting from third to fourth speed drive, the 3-4 shift fork lever 42 is pivoted counterclockwise to the fourth speed position as shown in FIG. 9 and the locking pin 47 moves along stop surface 89 without causing clockwise movement of the sequence lever 86 which thus remains in its unlock position. Thus in third speed drive and also in fourth speed drive, the sequence lever 86 is in its unlock position in which latching arm 97 is out of the path of the locking pin 39 to permit clockwise movement of the 1-2 shift fork lever 34 to effect downshifting to the first speed drive. The projection 98 is engaged by the outer cam surface 65 of interlock lever 51 when lever 51 is in its neutral position to hold the sequence lever 86 in its lock position on the shift from second to the third speed drive.

The above described embodiment is illustrative of the invention which may be modified within the scope of the appended claims.

I claim:

1. In a shift control linkage for a multispeed transmission the combination of linkage support means, a first shift control lever pivotally mounted on said support means for pivotal movement from a first drive establishing position to a neutral position to a second drive establishing position, a second shift control lever pivotally mounted on said support means for pivotal movement from a neutral position to at least a third drive establishing position, detent means for holding each of said shift control levers in neutral position while the other shift control lever is moved to a drive establishing position, and sequence means for locking said first shift control lever against movement from said second drive establishing position to said first drive establishing position only until said second shift control shift lever is moved from neutral position to said third drive establishing position.

2. In a shift control linkage for a multispeed transmission the combination of linkage support means, a first shift control lever pivotally mounted on said support means for pivotal movement from a first drive establishing position to a neutral position to a second drive establishing position, a second shift control lever pivotally mounted on said support means for pivotal movement from a neutral position to at least a third drive establishing position, detent means for holding each of said shift control levers in neutral position while the other shift control lever is moved to a drive establishing position, and sequence means for permitting movement of said first shift control lever from the neutral position to said first drive establishing position while locking said first shift control lever against movement from said second drive establishing position to said first drive establishing position when said second shift control shift lever is in the neutral position and permitting movement of said first shift control lever from said second drive establishing position to said first drive establishing position after said second shift control lever is moved to said third drive establishing position.

3. In a shift control linkage for a multispeed transmission the combination of a transmission having gearing and shiftable elements operable on selective shifting to establish different transmission drives through said gearing, shift linkage support means, a pair of shift fork levers each operatively engaging one of said shiftable elements and pivotally mounted on said support means for pivotal movement from a neutral position to a drive establishing position to effect shifting operation in said gearing to shift from neutral to one of the transmission drives, one of said shift fork levers having first and second drive establishing positions, the other shift fork lever having at least a third speed drive establishing position, each said shift fork lever having a locking member movable therewith, detent levers cooperating with said locking members to hold each said shift fork lever in neutral position while the other shift fork lever is moved to a drive establishing position, a locking lever having cam means at one end and both cam means and locking means at the other end, and said locking lever pivotally mounted on said support means for pivotal movement about the axis of said detent levers with the locking member on said one shift fork lever engageable with one of said cam means to move said locking lever to a lock position to position said locking lever to engage the locking member on said one shift fork lever to prevent movement of said one shift fork lever from said second speed drive establishing position through neutral to said first speed drive establishing position while said other shift fork lever is being held in the neutral position and the other locking member engageable with the other cam means on movement of said other shift fork lever from neutral to said third speed drive establishing position to move said locking lever to an unlock position to prevent said locking means from thereafter engaging the locking member on said one shift fork lever to thereafter permit movement of said one shift fork lever to said first speed drive establishing position.

4. In a shift control linkage for a multispeed transmission the combination of a transmission having gearing and shiftable elements operable on selective shifting to establish different transmission drives through said gearing, shift linkage support means, a pair of shift fork levers each operatively engaging one of said shiftable elements and pivotally mounted on said support means for pivotal movement from a neutral position to a drive establishing position to effect shifting operation in said gearing to shift from neutral to one of the transmission drives, one of said shift fork levers having first and second speed drive establishing positions, the other shift fork lever having third and fourth speed drive establishing positions, each said shift fork lever having a locking member movable therewith, a pair of detent levers each having at one end a cam surface and a locking recess and at the other end a neutral recess intermediate a pair of drive position recesses, said detent levers pivotally mounted on said support means for pivotal movement about a common axis and being located in opposite relationship with the locking recess on one detent lever and the neutral and shift position recesses on the other detent lever being engageable with each said locking member, spring means for biasing said detent levers to urge the neutral and drive position recesses into engagement with the cooperating locking member to yieldingly hold the associated shift fork lever in each drive establishing position, each said locking member on movement of the associated shift fork lever from the neutral position to a drive establishing position engaging one of said detent levers between the neutral recess and the drive position recess to pivot said one detent lever to move the locking recess at the other end into engagement with the other locking member to hold the other shift fork lever in the neutral position and the cam surface engaging the other locking member to prevent pivotal movement of the other detent lever when the other shift fork lever is not in the neutral position, a locking lever having cam means at one end and both cam means and locking means at the other end, and said locking lever pivotally mounted on said support means for pivotal movement about the axis of said detent levers with the locking member on said one shift fork lever engageable with one of said cam means to move said locking lever to a lock position to position said locking means to engage the locking member on said one shift fork lever to prevent movement of said one shift fork lever from said second speed drive establishing position through neutral to said first speed drive establishing position while said other shift fork lever is being held in the neutral position and the other locking member engageable with the other cam means on movement of said other shift fork lever from neutral to said third speed drive establishing position to move said locking lever to an unlock position to prevent said locking means from thereafter engaging the locking member on said one shift fork lever to thereafter permit movement of said one shift fork lever to said first speed drive establishing position.

* * * * *